MEMORY DEVICES OF THE SEMICONDUCTOR TYPE HAVING HIGH-SPEED READOUT MEANS

Filed Aug. 8, 1966 3 Sheets-Sheet 1

INVENTOR.
RYO IGARASHI

BY
OSTROLENK, FABER, GERB & SOFFEN
ATTORNEYS

May 5, 1970 RYO IGARASHI 3,510,849

MEMORY DEVICES OF THE SEMICONDUCTOR TYPE HAVING HIGH-SPEED READOUT MEANS

Filed Aug. 8, 1966 3 Sheets-Sheet 2

INVENTOR
BY RYO IGARASHI

OSTROLENK, FABER, GERB & SOFFEN
ATTORNEYS

INVENTOR.
RYO IGARASHI

BY

OSTROLENK, FABER, GERB & SOFFEN
ATTORNEYS

United States Patent Office 3,510,849
Patented May 5, 1970

3,510,849

MEMORY DEVICES OF THE SEMICONDUCTOR TYPE HAVING HIGH-SPEED READOUT MEANS

Ryo Igarashi, Tokyo, Japan, assignor to Nippon Electric Company, Limited, Tokyo, Japan Filed Aug. 8, 1966, Ser. No. 570,941
Claims priority, application Japan, Aug. 9, 1965, 40/48,377
Int. Cl. G11c *11/40, 5/02, 7/00*
U.S. Cl. 340—173 10 Claims

ABSTRACT OF THE DISCLOSURE

A semiconductor-type memory having memory cells arranged in a regular matrix of *m* rows and *n* columns. Each memory cell includes a bistable circuit, preferably utilizing field effect transistors. An additional field effect transistor associated with each memory cell bistable circuit is enabled when the readout row winding of its associated row is pulsed, to couple the output state of its bistable circuit to an associated sensing circuit, one sensing circuit being provided for each column of the matrix. The sensing circuit utilizes a semiconductor device maintained in its unsaturated state during readout and being coupled to receive a current from the field effect transistor associated with the row being read out and coupled to a memory cell so that the current passing therethrough yields a change in current in the sensing circuit representative of the state of the memory cell being read. The manner in which the semiconductor-type sensing circuit is coupled enables high-speed sensing of the memory state which is in the nanosecond range.

The instant invention relates to memory means, and more particularly to a novel readout system for semiconductor memory devices employing field effect transistors and yielding extremely advantageous reliable high-speed readout operation.

It is well known in the art to employ bistable circuitry such as flip-flop cidcuitry for the purpose of memorizing and indefinitely storing binary information. However, in memory devices in which a plurality of bistable circuits are arranged in a regular matrix fashion, the readout of the stored contents in memory has a significant amount of instability in that the memory contents are susceptible to being disturbed during readout and that the access time is susceptible to being slowed down appreciably, which unfavorable features tend to result in extremely slow operating speeds.

It is, therefore, a principal objective of the instant invention to eliminate the aforementioned defects present in conventional readout systems and to provide new and improved high-speed readout system capable of enhancing the overall speeds of electronic computers and the like through the use of memory devices as control memories.

One extremely advantageous feature of the instant invention is the annexation of peripheral circuitry hereinafter referred to as "digit circuitry" to a conventional memory device comprised of a plurality of memory cells arranged in a regular matrix, wherein the digit circuits are of simple construction and contain a minimum of ordinary PNP transistors and which digit circuits are capable of performing both readout and writing operations at extremely high speeds so as to realize the above mentioned object of the invention.

The instant invention is characterized by providing field effect transistor circuitry coupled between the bistable circuits and the digit lines in such a way as to significantly enhance operating speeds during both readout and writing operations, while at the same time substantially eliminating any memory circuit instability which exists as an inherent disadvantage in conventional bistable memory matrices. The output terminal of each bistable circuit arranged in one column of the matrix is coupled to a common columnar winding through a field effect transistor coupled between the bistable circuit output terminal and the columnar winding which, in turn, is coupled to an ordinary PNP or (NPN) transistor having a collector resistance whereby readout of the memory content of each bistable circuit is performed at the collector electrode by converting the current conducted through the transistor into a potential change at the collector electrode. The ordinary transistor in the digit circuit remains unsaturated throughout the readout operation, thereby effecting high-speed operation of the memory device since the readout operation is not seriously affected by the storage time of the transistor that would otherwise be present when such transistors are operated in the conventional manner.

It is, therefore, one object of the instant invention to provide a novel memory device comprised of a plurality of semiconductor bistable circuits and employing field effect transistors to greatly enhance reading and writing operating speeds.

Another object of the instant invention is to provide novel memory means employing bistable circuits arranged in a regular matrix wherein the digit lines of the matrix are coupled to each bistable circuit associated with the digit line through a field effect transistor.

These and other objects of the instant invention will become apparent when reading the accompanying description and drawings in which:

FIG. 1*a* is a diagrammatic cross-sectional view of a field effect transistor employed in a semiconductor memory device in accordance with the instant invention.

FIG. 1*b* is a symbolic representation of the field effect transistor of FIG. 1*a*.

FIGS. 2*a* and 2*b* are plots showing the electrical characteristics of field effect transistors of the type shown in FIGS. 1*a* and 1*b*.

FIG. 3*a* is a circuit diagram of a memory cell for use in one embodiment of the instant invention.

FIG. 3*b* is a symbolic representation of the memory cell of FIG. 3*a* showing the memory cell in block diagram form.

Figure 4:
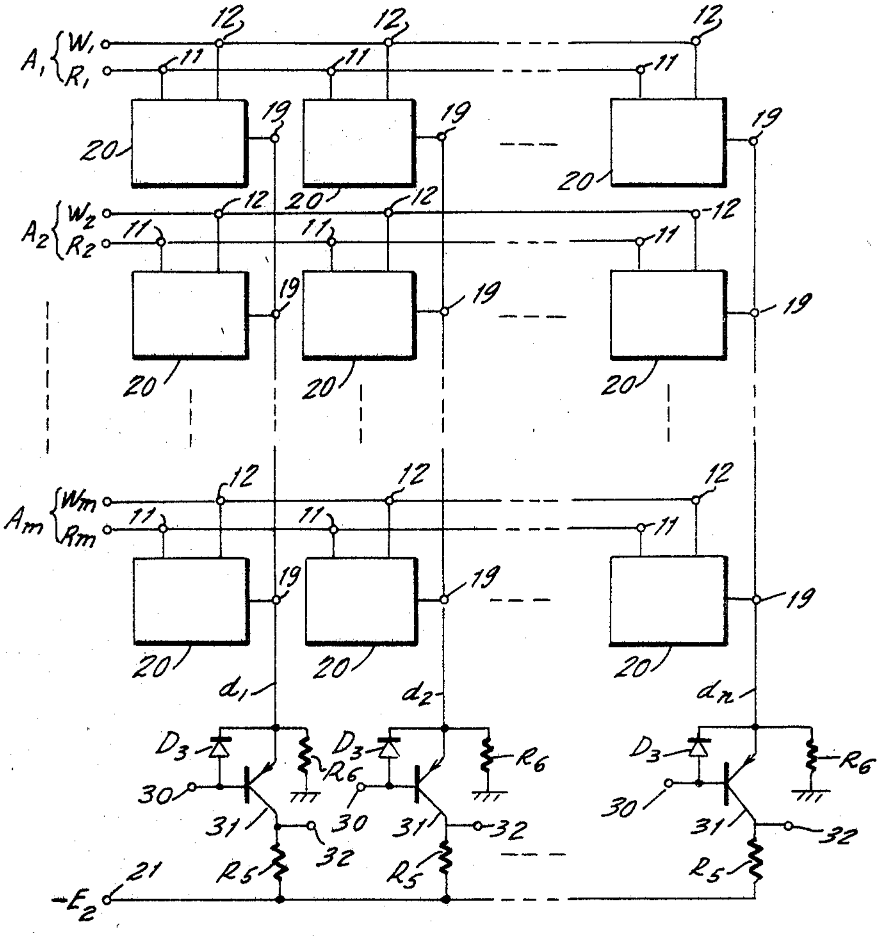
FIG. 4 is a schematic block diagram of one embodiment of the instant invention and is comprised of an array of memory cells arranged in a regular matrix and showing in schematic fashion a plurality of digit circuits (reading and writing circuits) employed as peripheral circuitry for the memory.

The principles of the instant invention will now be described in detail in conjunction with one preferred embodiment of the invention as illustrated in FIG. 4.

As shown therein, the embodiment is comprised of a plurality of memory cells 20, each consisting of the combination of a bistable circuit and a field effect transistor as well as a plurality of digit circuits employed as peripheral circuitry for control of the memory matrix. Before a detailed consideration of the memory matrix is considered, a brief description of the field effect transistors employed in the matrix will now be set forth in an effort to clarify the operation of the memory device.

Figure 1A:
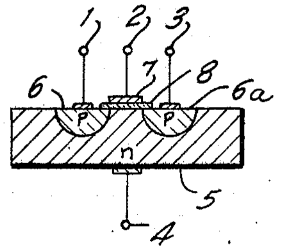

The structure of the field effect transistor used in the instant invention is substantially as illustrated in FIG. 1*a*. The basic field effect transistor structure (which will hereinafter be referred to in the abbreviated fashion FET, for purposes of brevity) is comprised of an N-type silicon substrate 5 having two P-type regions 6 and 6*a* formed within the substrate by diffusing an element therein such as boron. A silicon dioxide layer 8 is formed between the two regions 6 and 6*a*, as illustrated, and has an electrode 7 applied thereto. Suitable leads are then connected to the FET regions 6, 5, 6*a* and 7. The symbolic representation of the FET is illustrated in FIG. 1*b* showing the respective terminals 1, 4, 3 and 2.

Figure 1B:
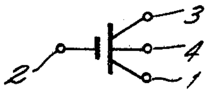

Terminals 2 and 4 in FIGS. 1*a* and 1*b* are generally referred to as the first and second gate terminals, respectively.

The input impedance is extraordinarily high in FET's, being of the order of $10^{11}$ ohms, due to the fact that the surface state of the substrate 5 interposed between the two P-type regions 6 and 6*a* can be controlled by the gate voltage applied on the first gate 2.

Figure 2A:
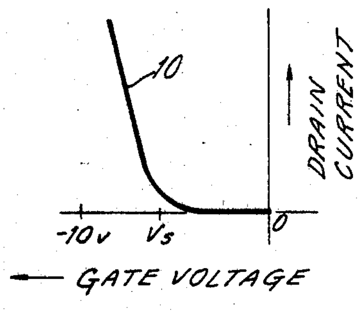

A consideration of the electrical performance of the field effect transistor will now be given:

Let it be assumed that a negative voltage is applied to the first gate 2 while the teminals 1 and 4 are grounded and while a negative voltage is applied at terminal 3. The negative voltage applied on the first gate 2 is then increased (i.e., made more negative). When the negative voltage applied to the first gate 2 reaches a predetermined value, the impedance across terminals 1 and 3 decreases and a current flows from terminal 1 to terminal 3. FIG. 2*a* portrays a curve 10 which relates the current plotted along the ordinate, to the first gate voltage, plotted along the abscissa, when a negative voltage is applied to terminal 3. Curve 10 is convex with respect to the abscissa and the value V*s* is the point corresponding to the convexity region of the curve 10. Although the value of *Vs* is governed by the specific structure of the field effect transistor, it becomes a rather simple matter to design the value of V*s* to lie in the range between −4 volts and −7 volts.

As will be evident from a consideration of FIG. 2*a*, the region lying on the lower left side of curve 10 is that region in which the impedance across terminals 1 and 3 of the FET is lower than the load resistance, whereas the region lying on the upper right-hand side of curve 10 is the region in which the impedance across terminals 1 and 3 can be made higher than the load resistance. The former and latter states will hereinafter be referred to, for convenience purposes, as the "ON" and the "OFF" states.

Referring again to FIG. 2*a*, when a voltage which is more positive than V*s*, say −3 volts, is applied to the first gate 2 of the FET, the impedance across terminals 1 and 3 reaches a value of the order of $10^9$ ohms.

The field effect transistor differs from typical PNP or NPN transistors in that the impedance across terminals 1 and 3 can be controlled by the voltage at the first gate with both terminals 3 and 4 being grounded. This clearly indicates that a current can be conducted from terminal 1 to terminal 3, or vice versa. In other words, the current in the FET flows from terminal 1 to terminal 3 when no (i.e., zero) voltage is applied to terminal 1 and a minus voltage is applied to terminal 3 with terminal 4 being grounded. For this reason, terminals 1 and 3 are typically referred to at times as the "source" electrode and the "drain" electrode, respectively. When a negative voltage is applied to terminal 1, and terminal 3 is grounded, terminals 3 and 1 operate respectively as the "source" and the "drain" electrodes.

It is also possible to use terminals 1 and 3 as the "source" and the "drain," respectively, when a negative voltage, say −1 volt, is applied to terminal 1 and a more negative voltage is applied to terminal 3, while terminal 4 is grounded. To place the field effect transistor in the "ON" state, it is necessary that the potential difference between the first gate 2 and the source (1 or 3) be on the lower left side of curve 10, shown in FIG. 2*a*.

Figure 2B:
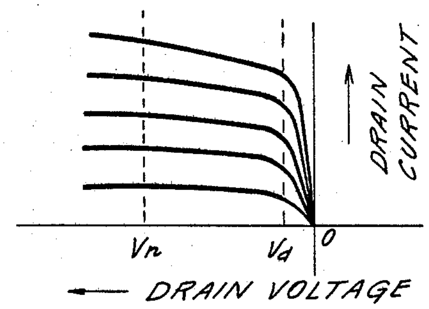

FIG. 2*b* illustrates the family of characteristic curves which are obtained when two negative voltages are applied on the drain and the first gate, respectively, with both the source and the second gate grounded. In this diagram, the drain current and voltage are respectively plotted along the ordinate and the abscissa, with the first gate voltage value being employed as a parameter to evolve the family of curves.

Among the features of the field effect transistor, therefore, is that the drain current varies markedly with slight variations in the drain voltage between the values zero and V*d*, whereas the drain current is substantially unaffected in the drain voltage in the region at or near the drain voltage value V*n*, as can clearly be seen from the family of curves shown in FIG. 2*b*.

Before entering into a theoretical analysis of why the readout system according to the instant invention is far superior to conventional systems, a full description will now be given of the operation of individual memory cells contained in the memory matrix, and the operation of the embodiment comprising a plurality of memory cells in the matrix and a plurality of digit circuits associated therewith for reading the memory contents stored in the memory cells.

Figure 3A:
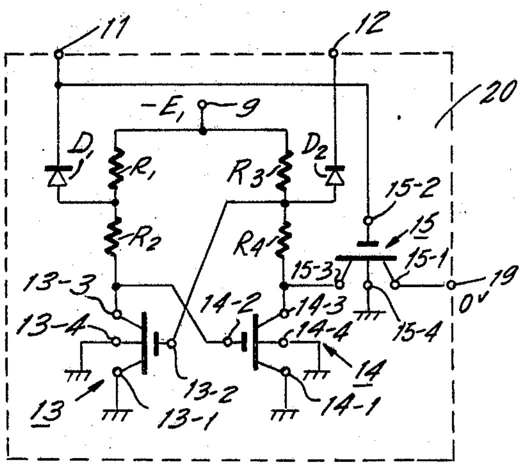

FIG. 3*a* shows a memory circuit 20 enclosed by the dashed line which is employed in the memory matrix of FIG. 4. The operation of the circuit 20, when all of the diodes $D_1$ and $D_2$ and the field effect transistor 15 are "OFF," is as follows:

The voltage $-E_1$ (−10 volts in the prefered embodiment) is applied to terminal 9 so that either FET 13 or 14 turns "ON." This results from the fact that the values of $R_1$ and $R_2$ in the load circuit of FET 13 are chosen so that the potential difference across terminals 13–3 and 13–1 of the field effect transistor 13 is approximately zero volts when FET 13 is "ON." As can clearly be seen, there exists a cross-coupling between the FET's 13 and 14, with the terminal 13–3 being coupled to the terminal 14–2 and the terminal 13–2 being coupled to the common terminal between resistors $R_3$ and $R_4$. With the FET 13 being turned "ON," the voltage at terminal 13–3 is substantially zero. This voltage level is impressed upon the first gate 14–2 producing an extremely high impedance between terminals 14–1 and 14–3 so as to turn FET 14 "OFF." With FET 14 in the "OFF" state, voltage at the common terminal between resistors $R_3$ and $R_4$ is substantially −10 volts which is applied to the first gate 13–2 of FET 13, thereby sustaining the "ON" state of FET 13. The values of resistors $R_3$ and $R_4$ have been so chosen that the transistor 13 is maintained in the "OFF" state when the transistor 14 is in the "ON" state.

Actual resistance values for the preferred embodiment were as follows:

$R_1=R_3=1$ megohm; and
$R_2=R_4=10$ kilohms

Anyone of the three impedances between the source and drain electrodes, while all of the devices 13, 14 and 15 are "ON," although subject to change by the potential difference across the first gate and the source, is approximately 1 kilohm for a potential difference of −10 volts.

In the values given above, the potential on the first gate 14–2 of 14 is approximately −0.001 volt and FET 14 is maintained "OFF" when 13 is "ON," whereas the potential at the first gate 13–2 of FET 13 is approximately −0.01 volt and 13 is maintained "OFF" when 14 is "ON."

The above mentioned operations occur for the case in which all of the diodes $D_1$ and $D_2$ and FET 15 are "OFF." This "OFF" state is realized by reducing potentials on terminals 11 and 12 to zero. This state is generally referred to as the memory state because the bistable state of the memory element is sustained.

Now, for the convenience of the description that follows, let it be assumed that a binary "1" corresponds to the case when FET's 14 and 13 are "ON" and "OFF," respectively, in the memory state, and a binary "0" corresponds to a case when FET's 14 and 13 are respectively "OFF" and "ON."

Figure 7:
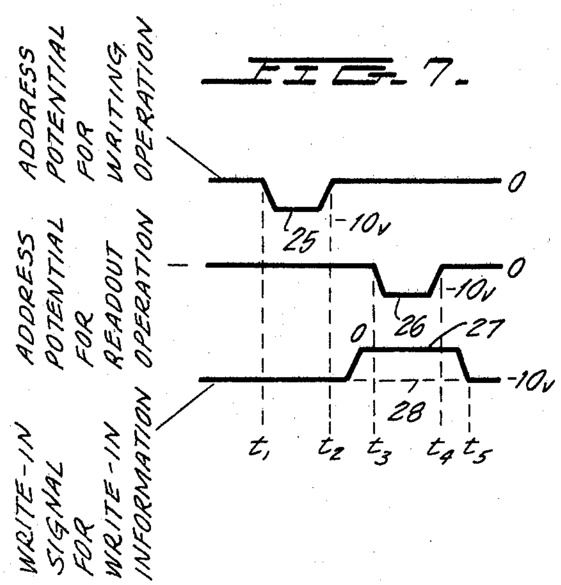
FIG. 7 shows a plurality of waveforms useful in describing the writing operations performed by a memory cell of the type shown in FIGS. 3*a* and 4.

The writing operation will now be considered with reference to FIG. 3*a*, as well as the waveform diagrams of FIG. 7:

When a pulse voltage, as shown at 25 in FIG. 7, is applied to terminal 12 for a time interval from $t_1$ to $t_2$, a −10 volt level is applied through diode $D_2$ to gate 13–2 which is sufficient to greatly reduce the resistance between terminals 13–1 and 13–3, thereby resetting field effect transistor 13 to the "ON" state (and hence, resetting FET 14 to the "OFF" state).

In this case, the potential on the first gate 13–2 of FET 13 varies from 0 to approximately −10 volts (strictly speaking, approximately −9.40 volts due to the forward potential drop present in diode $D_2$).

Thus, FET 13 turns "ON" while the potential on the drain terminal 13–3 becomes approximately 0. This zero level is applied to the gate 14–2, turning FET 14 "OFF." In this manner, a binary "0" is written into memory cell 20.

In order to write a binary "1" into the memory cell, a pulse voltage, as shown at 26 in FIG. 7, is applied to terminal 11 and, simultaneously therewith to first gate 15–2 of FET 15. Simultaneously with the application of pulse voltage 26, the potential on terminal 19 coupled to terminal 15–1 of FET 15, is varied from −10 volts to 0 volts, as shown by waveform 27 in FIG. 7, with the timing relationship between pulses 26 and 27 being as shown in FIG, 7. It should be noted that the potential on terminal 19 is −10 volts in the memory sate, i.e., in the state in which diodes $D_1$ and $D_2$ and FET 15 are "OFF." Accordingly, FET 15, having −10 volts applied to its first gate 15–2, is turned "ON" during the time period from $t_3$ to $t_4$, causing the potetnial at the common terminal between resistors $R_3$ and $R_4$ to be approximately 0 volts. Strictly speaking, the potential at this terminal is governed by the values of $R_3$, $R_4$, the impedance across terminals 15–3 and 15–1 when FET 15 is in the "ON" state and D-C potential $-E_1$, or −10 volts, is applied to terminal 9, and this value is found to be approximately −0.001 volt by computation. Thus, the FET 13 assumes the "OFF" state.

Simultaneously with this operation, diode $D_1$ conducts during the time interval from $t_3$ to $t_4$, causing the potential at the common terminal of resistors $R_1$ and $R_2$ to be reset to approximately −10 volts. The cross-coupling between terminals 13–3 and 14–2 causes a potential of approximately −10 volts to be applied to the first gate of FET 14, with the result that the field effect transistor 14 is turned "ON." Diode $D_1$ serves the function of resetting the potential of the first gate 14–2 of FET 14 to the value necessary for turning "ON" FET 14 substantially instantaneously.

The binary "0" state is written in the memory cell during the "OFF" state of FET 15 by applying a pulse voltage, as shown by waveform 26 in FIG. 7, on terminal 11 while the potential on terminal 19 is maintained at level 28 indicated by the dashed line, i.e., a level of −10 volts.

In this operation, a pulse voltage, as shown at 25 in FIG. 7, is applied to terminal 12 and the memory cell is thereby reset to the "0" state, with the result that the "0" state is sustained if the pulse voltage, as shown at 26 in FIG. 7, is applied to terminal 11. The writing operation is thereby accomplished at time $t_5$. Summarizing briefly, the memory cell is first reset by applying pulse waveform 25 to terminal 12 for a brief time interval. A binary "1" is then written into the memory cell by applying a pulse waveform 26 to terminal 11 and by turning FET 15 "ON" by pulse waveform 27. The pulse waveform 26 applied to terminal 11 in the absence of pulse waveform 27 leaves the binary "0" state of the memory element unaffected.

Figure 3B:
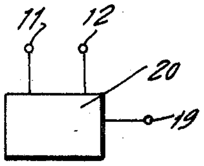

One typical application of memory cells as shown in FIG. 3*a* is in electronic computers. FIG. 4 depicts a memory device according to one embodiment of the instant invention which is comprised of a regular $m \times n$ array of memory cells arranged in a regular matrix and a plurality of digit circuits employed as control circuitry. The memory element, shown in schematic form in FIG. 3*a*, is shown in diagrammatic form in FIG. 3*b*. The reference numerals of the memory cell 20 of FIG. 3*a* are the same as shown in FIG. 3*b* and 4 for each of the cells 20, except that the D-C terminal 9, the grounded terminals, and the circuit details, have been omitted for purposes of simplicity.

Referring to FIG. 4, the terminals 11 provided in each of the $n$ memory cells of each row are effectively connected to left-hand terminals $R_1$ through $R_m$ by an address line I. The bus to which the terminal 11 of $n$ memory cells are respectively connected will hereinafter be referred to as "address line I." The other bus to which the terminals 12 of the $n$ memory cells in each row are respectively connected will hereinafter be referred to as "address line II."

Terminals 12 of the $n$ memory cells in each row are respectively connected to terminal $W_1$ through $W_m$ by means of an address line II. In addition thereto, the terminal 19 of $m$ memory cells in each column are respectively connected to one of $n$ digit lines $d_1$ through $d_n$.

The columnar lines or windings $d_1$ through $d_n$ are typically referred to as digit lines, since it is conventional to store a binary "1" across one row such that each digit line is associated with a column $d_1$ through $d_n$, hence the name digit line. In FIG. 4, terminals R and W in each row correspond to a pair of address lines $d_1$ through $d_n$. The writing operation for $n$ memory cells connected across a selected pair of address lines $A_1$ through $A_m$ is accomplished by applying a pulse waveform, as shown at 25 of FIG. 7, on the selected terminal $W_i$, a pulse waveform, as shown at 26 of FIG. 7, on the selected terminal $R_i$, and at the same time, by controlling the potential on the digit line in the manner, as illustrated at 27 or 28, with the timing relationships being, as shown in FIG. 7, wherein the operations set forth above are selected dependent upon the binary state of the information to be written in. In actuality, the potential applied to the digit lines $d_1$ through $d_n$ is controlled by the pulse waveform applied to terminals 30 in order that the digit potential may achieve either level 27 or 28, as shown in FIG. 7.

In writing a binary "1," the potential on the selected digit line is caused to vary from −10 volts to 0 volts, and then from 0 volts to −10 volts, as shown by the waveform pulse 27. The field effect transistors of unselected memory cells in the same column remain in the "OFF" state, irrespective of variations in the potential digit line, with the result that the memory content in the unselected memory cells remain completely undisturbed. Thus, only that row receiving pulse waveform 26 at the input terminal 11 will be set to binary "1," while the memory cells of the remaining rows will remain undisturbed.

The readout operation will now be considered. During readout, the $R_i$ winding of the selected row pair of windings $A_i$ is selected and the potential changes in the same manner as in writing on terminal R of the selected address line. Thus, as previously described, a pulse voltage, as shown by pulse waveform 26 of FIG. 7, is applied to the selected terminal $R_i$. The readout operation is defined as that operation in which a readout output signal corresponding to the memory contents in *n* memory cells 20 connected to the selected memory line $R_i$, is obtained from each of the *n* digit lines $d_1$ through $d_n$.

Figure 10:
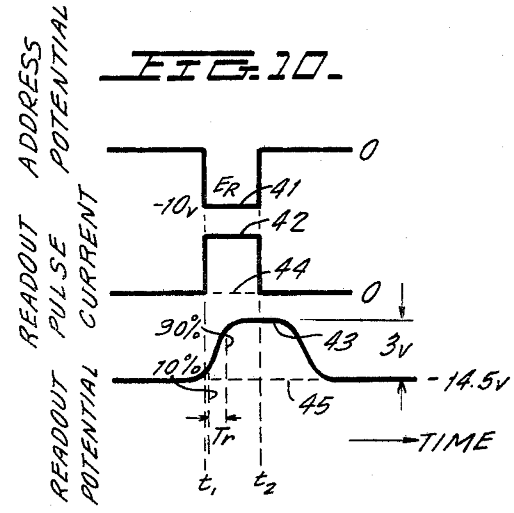
FIG. 10 shows a plurality of waveforms useful in describing the readout operation for memory cells of the type shown in FIGS. 3 and 4.

Although the pulse waveform signal applied to the terminal $R_i$ in address line pair $A_i$ in the readout operation should have a waveform, as shown at 26 in FIG. 7, let it be assumed that the voltage has a rectangular waveform shape, as shown at 41 in FIG. 10. For simplifying an understanding of the readout operation, the description of the readout operation, however, should in no way be obscured even though the rise time and fall of the readout pulse waveform are now being disregarded for purposes of simplicity.

Figure 5:
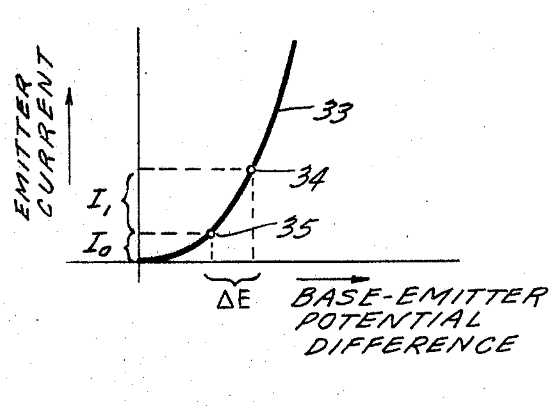
FIG. 5 is a plot illustrating the electrical characteristics of a conventional PNP transistor employed in the peripheral circuitry of the embodiment shown in FIG. 4.

The readout of a binary "0" of a particular memory cell connected to the selected address line terminal $R_i$ occurs as follows:

Since the FET 14 in the memory cell is turned "OFF" when the memory cell is in the binary "0" state, the drain potential of the FET, i.e., the potential $-E_2$ on terminal 14–3 of 14 is $-10$ volts. Consequently, the potential on terminal 15–3 of FET 15 in the memory cell 20 is $-10$ volts. A potential of $-10$ volts is applied to each of the *n* terminals 30 and hence to the base electrode of each PNP transistor 31 so that all the potentials on the *n* digit lines will be $-10$ volts except in the case of the writing operation. This signifies, strictly speaking, that the potential applied to the base electrode of each of the transistors 31 (which are ordinary PNP transistors) appears across resistor $R_6$ together with a small voltage drop across the emitter and base of each of the transistors 31. Variation of emitter current with base-emitter potential difference of each of the transistors 31 is depicted by the characteristic curve 33, shown in FIG. 5. In FIG. 5, curve 33 denotes the operating curve of the PNP transistor 31 when all of the $m \times n$ memory cells are in the memory state. Since each of the resistors $R_6$ in the preferred embodiment have values of 20 kilohms, the current $I_0$ in FIG. 5 is approximately 0.5 milliamp.

A potential $-E_2$ (which is $-15$ volts in the preferred embodiment) is present at all times at terminal 21. The collector resistors for transistors 31 and the resistors $R_5$ have a value of 1 kilohm in the preferred embodiment, resulting in the potential at terminals 32 of approximately $-14.5$ volts. This can easily be ascertained by the fact that the major portion of the emitter current of each transistor 31 flows in the collector when the $m \times n$ memory cells 20 are in the memory state.

The readout operation for readout of a binary "0" is as follows:

(a) The potential on each of the terminals 15–3 and 15–1 of FET 15 in each memory cell in the binary "0" memory state is $-10$ volts.

(b) In order to readout the memory contents stored in the memory cells 20 connected to the selected address line during the readout operation, a pulse voltage of the type shown by waveform 41 in FIG. 10 is applied to the first gate 15–2 of FET 15 in each of the memory cells in the selected address line.

(c) The FET 15 sustains the "OFF" state, with the result that the emitter current of the transistor 31 associated with the circuit remains unchanged and so does the potential at its collector terminal 32.

The major portion of the specification as follows will now be concerned with the explanation as to why the readout operation (as depicted by waveform 43 of FIG. 10) corresponding to the memory contents for a binary "1" state is obtained at the collector terminals 32 of the corresponding digit circuit.

It should be carefully noted that the difference in the reading operation as between sensing a binary "1" and a binary "0" state resides solely in whether or not the waveform 43 of FIG. 10 is made available at the output terminal 32.

Figure 6:
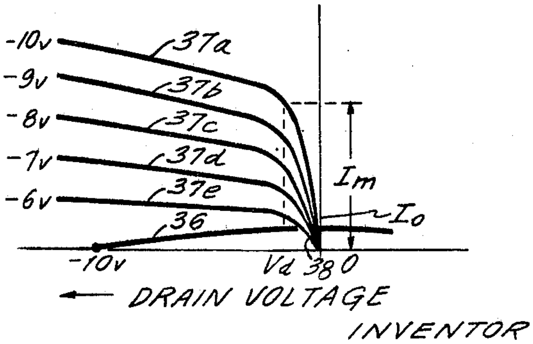
FIG. 6 is a plot illustrating the electrical characteristics of a field effect transistor of the type shown in FIG. 1*a*.

Assuming now that the FET 14 in at least one of the memory cells in the binary "1" memory state is "ON" and the operating point of the transistor is at the intersection 38 of curve 37*a* and load line 36, shown in FIG. 6:

The family of curves 37*a* through 37*e*, together with load line 36, provide a plurality of points of intersection establishing the operating points of the FET. The slope of load line 36 is determined by the values of resistances $R_3$ and $R_4$ and the D-C voltage $-E_1$ ($-10$ volts) applied to terminal 9, as shown in FIG. 3*a*. The family of curves 37*a* through 37*e* of FIG. 6 shows the relationship between the drain current and voltage which are plotted, respectively, along the ordinate and abscissa, with the first gate voltage being taken as the constant parmeter for each of the curves. As one example, the point of intersection between the curves 37*a* and load line 36 is at point 38. The drain current of FET 14 at point 38 in FIG. 6 is indicated as having a value $I_0$, which value is approximately 10 microamperes.

As will be evident from a consideration of FIG. 6, there is substantially a linear relationship between the drain current and the drain voltage, (i.e., the FET behaves as if it were a pure resistance) within the range from 0 to $-V_d$ volts. The drain clurrent $I_m$ in FIG. 6 denotes the maximum current along curve 37*a* which lies within the linear range for a gate voltage of $-10$ volts (which is the constant parameter for curve 37*a*). This constant value $I_m$ for the FET used in the embodiment is approximately 5 milliamperes, although this value is subject to change with changes in the structure of the FET.

The FET is held below the value $I_m$.

Figure 8:
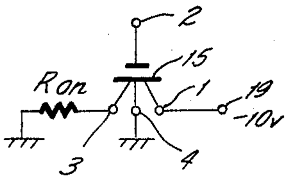
FIGS. 8 and 9 are two equivalent circuit diagrams for the memory cell of FIGS. 3*a* and 4.

With the above existing conditions, the readout operation for readout of a binary "1" will now be explained with reference to the equivalent circuit, as is shown in FIG. 8:

In FIG. 8, $R_{on}$ represent a resistance whose value is determined by the slope of curve 37*a* in the range of 0 to $-V_d$ volts, and is approximately 1 kilohm for the field effect transistor employed in the instant embodiment. The potential on terminal 19 of FIG. 8 is determined by the potential which is always applied to terminal 15–3 in FIG. 4. Thus, the potential on terminal 19 is maintained at $-10$ volts if FET 15 in FIG. 8 is turned "ON," and a current is thereby fed to the corresponding digit line, as is shown in FIG. 4.

Strictly speaking, the value should be slightly more positive than $-10$ volts, due to the fact that the operating point of the conventional PNP transistor 31 in FIG. 4 is caused to shift from the operating point 35 to the operating point 34 due to its emitter-base charcteristic and the readout current $I_1$ for the binary "1" state furnished from the FET 15.

The potential change in the digit line is indicated by the value $\Delta E$, as shown in FIG. 5. The value of the current $I_1$ in FIG. 5 is of the order of 3 milliamperes, as will be subsequently described, and the value of $\Delta E$ is therefore less than 0.10 volt. As was previously mentioned, the potential on the digit line is maintained approximately at $-10$ volts.

When the potential difference between the terminals 3 and 1 of the FET shown in the equivalent circuit of FIG. 8 (which is that equivalent circuit representing a readout current operation for readout of a binary "1" from the selected memory cell) is less than the voltage $V_d$ (i.e., its absolute value is larger than $V_d$) and is approximately $-2$ volts for FIG. 6, the FET 15 operates as constant-current source, and the magnitude of the drain current of FET 15 is determined by its mutual conductance *gm*, (a constant indicating the relation of the drain current to the potential difference between the first gate and the source of an FET).

For the purpose of evaluating readout operation, let it be assumed that the potential applied to terminal R of the selected address line A, which is also applied to the first gate 15–2 of FET in FIG. 8 is denoted by $E_R$ (which is −10 volts, as shown by waveform 41 in FIG. 10). Then the drain current $I_1$ of FET 15 in the equivalent circuit of FIG. 8 can be expressed as:

$$I_1=\frac{gm|(E_R-V_s)|}{1+R_{on}gm}$$

$V_s$ in Equation 1 is the same as $V_s$ of FIG. 2*a*. Let it be assumed that $V_s$ equals −4 volts. An actual value of the mutual conductance *gm* for the field effect transistor of the instant embodiment is approximent 1 millimho. Therefore, the drain current of FET 15 in FIG. 3, determined from Equation 1, is approximately 3 milliamperes.

For this value of current, it can clearly be seen that the operating point of FET 14 in each of the memory cells 20 connected to the selected address line during a binary "1" readout operation will lie on that portion of curve 37*a* (see FIG. 6) which is within the limits between 0 and $V_d$ volts. For this reason, it can be said that the equivalent circuit of FIG. 8 represents a sufficiently accurate representation of the binary "1" readout operation.

The operation of one of the *n* digit lines during a readout operation when one of the *m* memory cells 20 connected to the selected digit line will now be considered.

It has already been assumed that the selected memory cell 20 is in the binary "1" state. The current fed to the digit line from the selected memory cell is approximately 3 milliamperes (i.e., $I_1$ in FIG. 5 is approximately 3 milliamperes), which value was calculated above. The potential change on the digit line affected by the transfer of the operating point of transistor 31 connected to the digit line from operating point 35 to operating point 34 is indicated by the value ΔE, as shown in FIG. 5, which value is less than 0.10 volt, as was calculated previously. Thus, the potential on terminal 19 of the equivalent circuit shown in FIG. 8 can be considered to be at −10 volts.

The foregoing explanation may be recapitulated as follows:

In the readout of a binary "1" stored in a memory element, the current fed to a digit line via the FET 15 in each of the memory cells 20 connected to the selected address line R, will have a waveform, as shown at 42 in FIG. 10. Thus, the readout of output obtained at terminal 32, i.e. the collector terminal of transistor 31, when reading a binary "1" will now be considered, making reference to one of the *n* digit lines of FIG. 4. Since terminals 19 of *m* memory cells 20 are respectively connected to the digit line, the FET 15 in each of the memory cells will present a stray capacitance with respect to its associated digit line.

Inspection of the structure of the FET shown in FIG. 1*a* clearly reveals that a PN junction is formed between terminals 1 and 4 and that the PN junction is negatively biased, since terminal 4 is grounded (see terminal 15–4 of FIG. 3), and terminal 1 has a potential of −10 volts, and the PN junction presents the stray capacitance commonly referred to as the junction capacitance. Another cause for the presence of a stray capacitance in memory element 20 with respect to its associated digit line is probably due to an electrostatic capacitance caused by the electrostatic coupling between FET terminals 1 and 2, shown in FIG. 1*a*.

Figure 9:
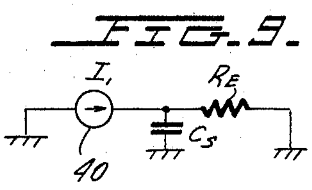

FIG. 9 shows a more simplified equivalent circuit for use in describing the supply of readout current for a binary "1" state from the selected memory cell to an associated PNP transistor 31 connected to the digit line with the circuit elements of the equivalent circuit of FIG. 9 representing the above mentioned phenomena. The equivalent circuit in FIG. 8, which exhibits a constant current characteristic in the readout of a binary "1" state, is indicated as a constant current source 40, shown in FIG. 9. Further, the stray capacitance with respect to the digit line and the input impedance of the transistor 31, looking into the emitter of the transistor, are respectively indicated as *Cs* and $R_E$ in FIG. 9.

The resistance $R_6$ (see FIG. 4) which would be connected in parallel across $R_E$, has been omitted from the equivalent circuit because $R_6$, according to the embodiment, has a value of 20 kilohms, and, therefore, can be substantially ignored with respect to $R_E$, which has a value of the order of tens of ohms. The value of $R_E$ is determined by the slope of the curve 33 between the operating points 34 and 35 of FIG. 5.

Most of the current $I_1$ that flows in resistor $R_E$ of FIG. 9 is introduced into the collector of transistor 31. This is due to the fact that the ratio of emitter current to collector current of transistor 31 is almost unity. Strictly speaking, the ratio of emitter current to collector current is determined by the transistor current amplification factor α, which is conventionally of the order of 0.98.

When a pulse current, as shown at 42 in FIG. 10, is generated by the constant current source 40 and the rise time of a pulse current conducted in resistance $R_E$ occurs within the time interval $t_1$ to $t_2$, the pulse current $I_E$ conducted in resistor $R_E$ is expressed by the equation $$I_E=I_1\left(1-e^{-\frac{1}{CsR_E}t}\right) \tag{2}$$

Let $T_1$ be a time interval required for $I_E$ to reach 10% of the maximum value of $I_1$, and let $T_2$ be that time interval required to reach 90% of the maximum value of $I_1$.

Then $$0.1=\left(1+e^{-\frac{T_1}{CsR_e}}\right) \tag{3}$$

$$0.9=\left(1-e^{-\frac{T_2}{C2R_E}}\right) \tag{4}$$

Substituting $Cs$=500 pf. and
$R_E$=50 ohms into Equations 3 and 4, in order to obtain the values of $T_1$ and $T_2$:

$T_1$=2.6 ns.
$T_2$=57.5 ns.

where ns.=$10^{-9}$ seconds.

Thus, the rise time ($T_r$, shown in FIG. 10), of the pulse current flowing in the emitter of transistor 31 of FIG. 4 is equal to 54.9 nanoseconds. In addition thereto, the potential change on terminal 32 of the transistor, due to the above mentioned current, is given approximately by $I_1 \cdot R_5$, which value is of the order of 3 volts because the value of $R_5$ is 1 kilohm, in accordance with the embodiment. This IR drop is depicted as being 3 volts, as can be seen from a consideration of waveform 43 of FIG. 10.

In the foregoing readout operation for readout of a binary "1," changes in potential on the collector electrode lie in the range between −14.5 and −11.5 volts. The transistor remains in the unsaturated state throughout this operation. This feature contributes greatly to the high-speed operation of the memory device because the succeeding readout operation is not deleteriously affected by the storage time of the transistor that would otherwise be produced if the transistor were to become saturated.

Thus, the readout operation for a memory element in the binary "1" state may be summarized as follows:

The main reason for high-speed operation during readout is due to the fact that the current fed to a digit line from each of the selected memory cells is conducted into the collector electrode of the transistor 31 connected to the digit line without substantially causing the potential on the digit line to change, whereas readout is performed at the collector electrode by converting the current conducted therein into a potential change.

Figure 11:
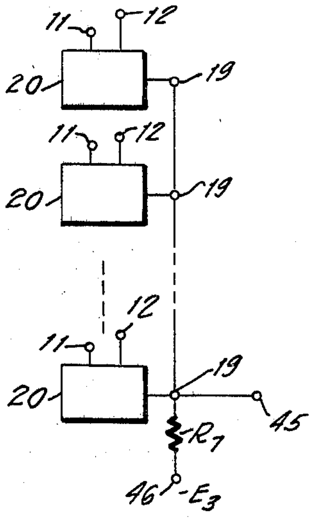
FIG. 11 is a schematic block diagram of a memory device employing a conventional readout system wherein only one column of such a conventional system is illustrated for purposes of simplicity.
Figure 12:
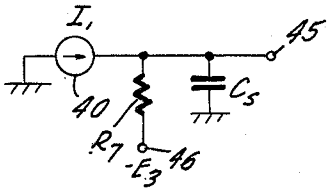
FIG. 12 shows the equivalent circuit for such a conventional readout system useful in describing the conventional readout operation.

The reason why the present readout system is superior to conventional readout systems will now be demonstrated by making reference to a schematic diagram for a conventional readout system, as shown in FIG. 11, and its equivalent circuit, as shown in FIG. 12.

FIG. 11 is a simplified representation illustrating only one column of the memory device which is comprised of *m* memory elements 20. In the system of FIG. 11, the readout output is obtained at terminal 45 by applying the voltage $-E_3$ (or $-10$ volts) across the *m* memory cells 20 connected to the associated digit line. This voltage is applied as well to resistor $R_7$ coupled between terminal 45 and terminal 46.

In readout of a memory element having a binary "0" state, a pulse voltage, as shown at 41 in FIG. 10, is applied to terminal 11 of one of the *n* memory cells 20 in FIG. 11, which memory cell stores a binary "0." The field effect transistor 15 of the selected memory cell 20 remains in the "OFF" state, due to the binary "0" state of the memory cell, with the result that the potential at terminal 45 remains unchanged at $-10$ volts. In readout of a memory cell during a binary "1," a pulse current, as shown at 42 in FIG. 10, is applied to the digit line of FIG. 11 from the selected one of the *m* memory cells 20, causing the potential on the digit line to increase from $-10$ volts to a value close to zero volts. While the potential on terminal 15–1 (see FIG. 3*a*) is between $-10$ volts and $V_d$ (equal to $-2$ volts), the circuit of FIG. 11 can be approximated by the equivalent circuit of FIG. 12.

The potential V available at terminal 45 in FIG. 12 may be expressed as $$V=E_3+I_1R_7\left(1-e^{-\frac{1}{CsR_7}}\right) \qquad (5)$$

Equation 5 indicates that the potential on terminal 45 of FIG. 12 is the sum of the voltage $-E_3$ and a variable potential $\Delta V$ which is expressed as $$\Delta V=I_1R_7\left(1-e^{-\frac{1}{CsR_7}}\right) \qquad (6)$$

As will be evident from a consideration of Equation 6, the ultimate value of the potential variation on terminal 45 in FIG. 12 becomes $I_1R_7$ after a time interval determined by the time constant $C_sR_7$. However, the pulse width of the pulse voltage applied to terminal 11 of the selected memory cell occurs within a predetermined time interval, as shown at 41 in FIG. 10.

A comparison will now be made between the circuit of FIG. 4 and the conventional circuit of FIG. 11 and 12 in the case where a binary "1" is being read out from the memory cell.

Assuming that the value of $I_1R_7$ is 3 volts, i.e., assuming that the value of $R_7$ is 1 kilohm, the time interval $T'_2$ in which the potential change on terminal 45 in FIG. 11 achieves 90% of the maximum value of $I_1R_7$ (i.e., 3 volts) is expressed by the equation $$0.9=\left(1-e^{-\frac{T'_2}{CsR_7}}\right) \qquad (7)$$

Assuming that the value of $C_s$ in Equation 7 is 500 pf. (i.e., the same value of $C_s$ employed in the solution of Equations 2 through 4), then $$T_2'=1{,}150 \text{ ns.} \qquad (8)$$

In conclusion, in order to obtain the same magnitude of readout voltage, the readout speed of the circuit in FIG. 4 operates twenty times faster than the readout speed of the circuit of FIG. 11 which can be seen from a comparison of the values $T_2'$ equals 1,150 ns. as against $T_2$ equals 57.5 ns. It is, therefore, readily obvious that the readout circuitry of the instant invention is much more advantageous for high-speed use than conventional systems.

It can, therefore, be seen from the foregoing description that the instant invention provides a novel readout circuit for bistable memory cells having reading and writing operating speeds which are significantly faster than memory cells of the bistable type which employ conventional readout means.

While the principles of the readout system in accordance with the instant invention have been described in connection with a particular embodiment, it should be clearly understood that many variations and modifications of the principles of the invention within the scope of the description will be obvious to those with ordinary skill in the art. For example, the present readout system provides all of its advantageous features when used with semiconductor memory devices in which each of the bistable circuits described herein as being comprised of fiield effect transistors are eliminated and substituted with conventional PNP or NPN transistors. Accordingly, the instant invention should be bound not by the specific disclosure herein contained, but only by the appending claims.

What is claimed is.

1. A readout system for memory cells of the semiconductor type comprising:

a plurality of *m* times *n* memory cells arranged in a matrix having *m* rows and *n* columns;

each of said memory cells comprising a bistable circuit capable of storing a bit of binary information and a first field effect transistor coupled to said bistable circuit;

*n* digit lines each being associated with all of the *m* memory cells of its associated column;

each digit line being connected to the bistable circuits of its column through the field effect transistor of each memory cell;

a first plurality of *m* address lines for each row of the matrix being coupled to the bistable circuit and one input terminal of the field effect transistor of each memory cell associated with each row;

*n* digit circuits respectively connected to said *n* digit lines;

each of said digit circuits being comprised of a transistor having collector, emitter and base electrodes; a load impendance coupled to said collector electrode; said emitter electrode being coupled to an associated digit line;

first means for selectively applying a readout pulse to one of said first address lines causing the field effect transistors of the memory cells in one predetermined state associated with the selected address line to generate readout currents, which readout currents are introduced into the collectors of the corresponding transistors coupled to said digit lines to cause a potential change at the collector electrodes which constitutes a readout signal representative of said one predetermined state.

2. The readout device of claim 1 further comprising plural diode means each being coupled between the emitter and base electrodes of the transistors coupled to said digit lines for maintaining said transistors in the unsaturated state during a readout operation.

3. The readout device of claim 1 wherein each of said first field effect transistors is provided with a drain, a source and a gate electrode; said gate electrode being coupled to an associated address line; said source electrode being coupled to its associated bistable circuit; said drain electrode being coupled to an associated digit line.

4. The readout device of claim 1 wherein each of said bistable circuits is comprised of first and second transistors coupled to form a bistable flip-flop circuit; each of said transistors having at least one input and one output terminal; the input terminal of said first transistor being coupled to its associated address line; the output terminal of said second transistor being coupled to said field effect transistor.

5. The readout device of claim 3 wherein each of said bistable circuits is comprised of first and second transistors coupled to form a bistable flip-flop circuit; each of said transistors having at least one input and one output terminal; the input terminal of said first transistor being coupled to its associated address line; the output terminal of said second transistor being coupled to said field effect transistor gate electrode.

6. The readout device of claim 1 wherein each of said bistable circuits is comprised of second and third field effect transistors each having gate, source and drain electrodes, and being cross-coupled through circuit means to form a bistable flip-flop circuit;

the gate electrode of said first field effect transistor being coupled to its associated address line;

the drain electrode of said second field effect transistor being coupled to the said first field effect transistor.

7. The readout device of claim 3 wherein each of said bistable circuits is comprised of second and third field effect transistors each having gate, source and drain electrodes, and being cross-coupled through circuit means to form a bistable flip-flop circuit;

the gate electrode of said first field effect transistor being coupled to its associated address line;

the drain electrode of said second field effect transistor being coupled to the gate electrode of said first field effect transistor.

8. The device of claim 7 further comprising a second group of *n* address lines each being coupled to the gate electrodes of said third field effect transistors of the *n* memory cells of the row associated with the second address line; second means for generating a pulse in a selected one of said second address lines for resetting said memory cells to the binary zero state.

9. The device of claim 8 further comprising third means for generating a pulse in a selected one of said digit line transistors simultaneously with the generation of a pulse in one of said first address lines for writing a binary "ONE" into the memory cells receiving pulses from said second and third pulse generating means.

10. A readout system for memory cells of the semiconductor type comprising:

a plurality of *m* times *n* memory cells arranged in a matrix having *m* rows and *n* columns;

each of said memory cells comprising a bistable circuit having an output and being capable of storing a bit of binary information and a first three-terminal field effect transistor having one terminal coupled to the output of its associated bistable circuit;

*n* digit lines each being associated with all of the *m* memory cells of its associated column;

each digit line being connected to the bistable circuits of its column through a second terminal of the field effect transistor of each memory cell;

a first plurality of *m* address lines for each row of the matrix being coupled to one input of a bistable circuit and to a third terminal of the field effect transistor of each memory cell associated with each row;

*n* digit circuits respectively connected to said *n* digit lines;

each of said digit circuits being comprised of a transistor having collector, emitter and base electrodes; a load impedance coupled to said collector electrode; said emitter electrode being coupled to an associated digit line;

first means for selectively applying a readout pulse to one of said first address lines causing the field effect transistors of the memory cells in one predetermined state associated with the selected address line to generate readout currents, which readout currents are introduced into the collectors of the corresponding transistors coupled to said digit lines to cause a potential change at the collector electrodes which constitutes a readout signal representative of said one predetermined state.

References Cited

UNITED STATES PATENTS

| | | | |
|---|---|---|---|
| 3,020,418 | 2/1962 | Emile | 307—291 X |
| 3,218,613 | 11/1965 | Gribble | 340—173 |
| 3,284,782 | 11/1966 | Burns | 340—173 |
| 3,275,996 | 9/1966 | Burns | 340—173 |

OTHER REFERENCES

Pleshko, Nondestructive Readout Memory Cell Using Mos Transistors, IBM Tech. Disclosure Bulletin, vol. 8, No. 8, January 1966, pp. 1142–3.

TERRELL W. FEARS, Primary Examiner

H. L. BERNSTEIN, Assistant Examiner

U.S. Cl. X.R.

307—238, 279, 291